(12) United States Patent
Smith et al.

(10) Patent No.: US 7,224,787 B1
(45) Date of Patent: May 29, 2007

(54) METHODS AND SYSTEMS FOR PERFORMING SPECIAL SERVICE MAINTENANCE AND INSTALLATION OPERATIONS IN A TELECOMMUNICATIONS SYSTEM

(75) Inventors: Steven G. Smith, Roswell, GA (US); Robert H. Willis, Jr., Louisville, KY (US); James R. Miller, Lawrenceville, GA (US); James R. McCracken, Atlanta, GA (US); Ralph J. Mills, Atlanta, GA (US); R. Eddie Glascoe, Jr., Alpharetta, GA (US)

(73) Assignee: BellSouth Intelllectual Property Corporation, Wilimington, DE (US)

( * ) Notice: Subject to any disclaimer, the term of this patent is extended or adjusted under 35 U.S.C. 154(b) by 579 days.

(21) Appl. No.: 10/246,188

(22) Filed: Sep. 18, 2002

(51) Int. Cl.
H04M 3/42 (2006.01)

(52) U.S. Cl. .............................. 379/201.12; 379/201.01

(58) Field of Classification Search ........... 379/201.12, 379/22.04, 22, 112.01, 201.01; 715/717; 705/7
See application file for complete search history.

(56) References Cited

U.S. PATENT DOCUMENTS

| | | | |
|---|---|---|---|
| 4,841,560 A | 6/1989 | Chan et al. | |
| 4,922,516 A | 5/1990 | Butler et al. | |
| 4,977,399 A | 12/1990 | Price et al. | |
| 5,666,481 A | 9/1997 | Lewis | |
| 5,687,212 A | 11/1997 | Kinser, Jr. et al. | |
| 5,798,733 A | 8/1998 | Ethridge | |
| 5,880,958 A | 3/1999 | Helms et al. | |
| 5,881,131 A | 3/1999 | Farris et al. | |
| 5,896,440 A | 4/1999 | Reed et al. | |
| 5,897,640 A | 4/1999 | Veghte et al. | |
| 5,920,846 A | * 7/1999 | Storch et al. | 705/7 |
| 5,922,040 A | 7/1999 | Prabhakaran | |
| 5,937,048 A | * 8/1999 | Pelle | 379/201.12 |
| 5,956,024 A | * 9/1999 | Strickland et al. | 715/717 |
| 5,987,381 A | 11/1999 | Oshizawa | |

(Continued)

FOREIGN PATENT DOCUMENTS

EP      0 712 227 A2      5/1996

(Continued)

OTHER PUBLICATIONS

U.S. Appl. No. 10/032,530, filed Oct. 25, 2001.

(Continued)

*Primary Examiner*—Ahmad F. Matar
*Assistant Examiner*—Thjuan K. Addy
(74) *Attorney, Agent, or Firm*—Merchant & Gould

(57) ABSTRACT

Methods and systems are provided for processing data in association with an operation performed by a technician at a customer service location in a telecommunications system. In one embodiment, the method includes transmitting data related to at least one piece of existing telecommunications equipment being used in connection with the special service at the customer service location; communicating at least one alternative candidate for the existing telecommunications equipment through at least one graphical user interface to the technician at the customer service location; and, generating change data including at least one new candidate selected from a group of the alternative candidates for replacement of the existing telecommunications equipment at the customer service location. Computer-readable media embodiments of the present methods are also provided.

26 Claims, 13 Drawing Sheets

U.S. PATENT DOCUMENTS

| | | |
|---|---|---|
| 6,101,443 A | 8/2000 | Kato et al. |
| 6,141,609 A | 10/2000 | Herdeg et al. |
| 6,154,152 A | 11/2000 | Ito |
| 6,167,255 A | 12/2000 | Kennedy, III et al. |
| 6,185,484 B1 | 2/2001 | Rhinehart |
| 6,192,314 B1 | 2/2001 | Khavakh et al. |
| 6,215,855 B1 * | 4/2001 | Schneider .................... 379/22 |
| 6,246,361 B1 | 6/2001 | Weill et al. |
| 6,285,931 B1 | 9/2001 | Hattori et al. |
| 6,332,163 B1 | 12/2001 | Bowman-Amuah |
| 6,343,290 B1 | 1/2002 | Cossins et al. |
| 6,389,426 B1 | 5/2002 | Turnbull et al. |
| 6,427,119 B1 | 7/2002 | Stefan et al. |
| 6,430,562 B1 | 8/2002 | Kardos et al. |
| 6,477,238 B1 * | 11/2002 | Schneider et al. ....... 379/22.04 |
| 6,477,526 B2 | 11/2002 | Hayashi et al. |
| 6,484,092 B2 | 11/2002 | Seibel |
| 6,505,120 B2 | 1/2003 | Yamashita et al. |
| 6,516,055 B1 | 2/2003 | Bedeski et al. |
| 6,526,349 B2 | 2/2003 | Bullock et al. |
| 6,532,418 B2 | 3/2003 | Chun et al. |
| 6,891,937 B1 * | 5/2005 | Kuhn et al. ............ 379/112.01 |
| 2002/0120713 A1 | 8/2002 | Gupta et al. |

FOREIGN PATENT DOCUMENTS

| | | |
|---|---|---|
| EP | 0 712 227 A3 | 11/1999 |
| WO | WO 00/02365 | 1/2000 |

OTHER PUBLICATIONS

International Application No. PCT/US02/33667 filed Oct. 25, 2001.
U.S. Appl. No. 10/103,045, filed Mar. 21, 2002.
U.S. Appl. No. 10/060,562, filed Jan. 30, 2002.
U.S. Appl. No. 10/074,325, filed Feb. 12, 2002.
International Application No. PCT/US03/02742 filed Jan. 30, 2003.
U.S. Appl. No. 10/175,699, filed Jun. 20, 2002.
U.S. Appl. No. 10/032,853, filed Oct. 25, 2001.
U.S. Appl. No. 10/445,861, filed May 27, 2003.
International Application No. PCT/US02/33755 filed Oct. 22, 2002.

* cited by examiner

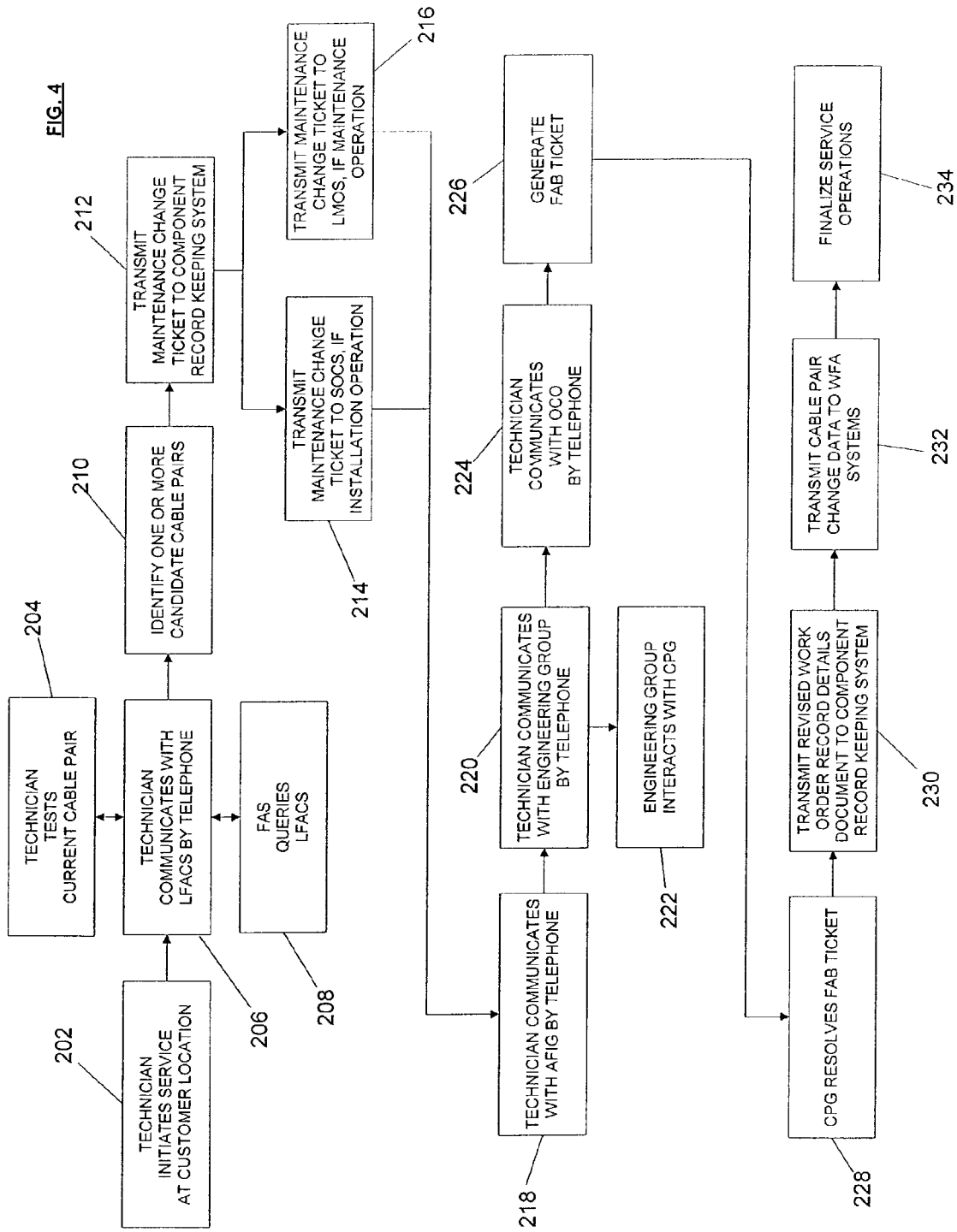

```
command option INQ FASG EMP=HC,WC=LNO,CKID=60.PLPC.503186..SC,TID=CKL 1

FACILITY ASSIGNMENT OUTPUT                        page 1L
                                                                    emp HC
wc LNO
ckid 60.PLPC.503186..SC,tid CKL 1
****************************************************************************
ckid 60.PLPC.503186..SC,tid CKL 1   lp stat WKG  au P2IUX SSP ADSR
csw: ex Y trm Y
grd 1 cls B #wires 2 mi N ctg V cote N met N
avc-typ SSPL
fl  ca 80   pr 599     stat WKG bp/clr 599
tea I 365-7.4A CANAL ST type FIXED  LOOP MAKEUP EXISTS   taper code: 73013
addr  365 CANAL ST com NEW ORLEANS   serv tea I 365-.4A CANAL ST
     type FIXED    rz 13 ptr  80:1 type:FLEX RSV EXIST FOR THIS ADDRESS next     (M) (P) (Q)             END            END           END
```

FIG. 5

```
** FACS MENU **
       command option MCI LP    TMP  HC,WC=LNO,CA=80,PR  599 select menu:
              (1)   assist order
              (2)   loop assignment
              (3)   loop selection
              (4)   loop maintenance
              (5)   inventory
              (6)   bulk inventory
              (7)   engineering work order
              (8)   control order processing
              (9)   control order: status
             (10)   send/resend data
             (11)   inquiry
             (12)   report
             (13)   table edit
             (14)   bulk order processing
             (15)   tandem order enter number chosen
```

| Request Candidate Pairs | |
|---|---|
| TN / CKTID | F2/XHGS/702488 /SB |
| Terminal ID | |
| Wire Center | 904104 |
| Cable | 3501T |
| Pair | 0797 |
| Order Number | NY25GD43 |
| Terminal Address | I 328B S 3RD DTREET |

Cancel  OK

FIG. 12

METHODS AND SYSTEMS FOR PERFORMING SPECIAL SERVICE MAINTENANCE AND INSTALLATION OPERATIONS IN A TELECOMMUNICATIONS SYSTEM

BACKGROUND

Effective customer service is an essential requirement for commercial enterprises to compete successfully in a conventional worldwide economy. In the telecommunications industry, for example, providing customer service is an important part of sustaining market share in view of multiple competitors in the industry. In addition, to promote revenue growth for a telecommunications entity, for example, it is also important to provide customer service in a cost effective manner. The telecommunications entity needs effective and efficient methods and systems for performing installation and maintenance operations for the services offered to its customers.

Installation and maintenance service technicians working for a telecommunications entity typically need to collect a wide variety of data when performing field service operations for customers of the entity. In one conventional process, service is performed by these technicians on telecommunications equipment at a variety of customer locations. At the time service is performed, data may be communicated to the technician to assist in performing the service. Data may also be communicated to one or more computer systems employed by the telecommunications entity for analysis and other processing. Such data may be related to operation of a special service offered to the customer by the entity such as, for example, a high-speed data transmission service.

In a conventional process, at least part of the data communicated during a service operation is transmitted to/from the technician through a telephone or other wireline connection. This form of communication is labor intensive, however, and often sacrifices the productive time of the technician. Delays in communication can reduce the ability of the technician to accomplish multiple tasks in a single work shift. The technician may be forced to remain on hold, for example, waiting for an attendant to communicate with the technician to convey data related to diagnosis and completion of the service operation. It can be seen that data related to the service operation are not transmitted and processed on a near real-time basis. This conventional process also introduces many undesirable opportunities for error into the service operation. In addition, the telephone communication requirement of this process can result in complicated and non-uniform training procedures for new service technicians.

One example of a special service offering of a telecommunications entity involves the implementation and function of a high-speed data communications circuit. In an illustrative telecommunications circuit shown in FIG. 1, a central office 2 (also sometimes herein "CO") is operatively connected to a customer location 4 by a cable pair 6. The cable pair 6 is configured for communication of data between the central office 2 and the customer location 4. In one aspect, the cable pair 6 can be employed to perform high-speed data transmission (e.g., HDSL) between the central office 2 and the customer location 4. As shown, the cable pair 6 can include one or more conductor sections 8, 10, 12 (e.g., copper wire) used to transmit a signal. Each conductor section 8, 10, 12 can have a corresponding length $l_1$, $l_2$, $l_3$ and gauge $g_1$, $g_2$, $g_3$ (respectively).

It can be appreciated that each conductor section 8, 10, 12 can have different electrical characteristics (i.e., conductance, resistance, capacitance, inductance, frequency loss, and the like) that impact transmission of a high-speed signal through the cable pair 6. In designing the high-speed communications circuit, therefore, the loss characteristics (e.g., loss of signal strength) of each conductor section should be analyzed to determine total loss for the entire circuit. This analysis of loss characteristics assists in evaluating the viability of the circuit for high-speed signal transmission. Components such as a regenerator 14 and a booster 16, for example, can be employed to enhance the suitability of the circuit for signal transmission. The regenerator 14 can be configured to regenerate a signal whose strength (typically measured in decibels) has degraded to the point where the signal has ceased or almost ceased to transmit through the cable pair 6. The booster 16 can be configured to increase the strength of the signal to a level that promotes effective use of the signal at the customer location 4.

In the event a change in the connection is needed, however, another available connection at the customer location 4 may not possess the requisite electrical characteristics to maintain the service level associated with the existing connection. For example, due to its different signal loss characteristics, a connection may be suitable for transmitting voice communications from the customer location 4 to the central office 2, but may not be suitable for transmitting high-speed data transmissions. Thus, for a high-speed service, a service technician 18 providing service at the customer location 4 cannot merely exchange the existing connection for another available connection without testing the new connection. The service technician 18 must identify an appropriate alternative cable pair, for example, that can sustain the service level of the prior cable pair connection.

In a conventional process, if the service technician 18 is at the customer location 4 to perform a special service pair change, for example, the technician 18 must communicate with a variety of personnel of the telecommunications entity by telephone. The technician 18 may need to contact an assignment office to analyze a proposed connection from the perspective of the customer. The technician 18 may also need to verify the presence of a load coil, for example, on the proposed connection (i.e., verify whether the proposed connection is "loaded" or "unloaded"). A load coil can block a high-speed signal from transmitting along a cable pair. Thus, personnel at the assignment office may need to check cable pair records for the presence of such load coils to ensure the availability of a proposed connection for reassignment to a special service application. In addition, personnel administering a component record keeping system for the telecommunications entity may need to be contacted by the technician 18 regarding the loss characteristics of the proposed connection. It can be seen that many separate telephone communications may be required to ensure that records are updated and circuit changes are properly implemented to provide the special service at the customer location 4.

It can be appreciated that a number of problems are inherent in the aforementioned conventional methods and systems for providing high-speed data transmission service. A technician may be forced to spend excessive amounts of time waiting to achieve telephone contact with one or more personnel of a telecommunications entity. Such telephone communications lend themselves to an increased possibility of error in diagnosing and addressing circuit design issues. These conventional methods and systems can adversely impact the integrity and real-time delivery of data collected and processed during installation and maintenance service operations. Furthermore, a variety of non-uniform and inconsistent training procedures may arise as a result of the lack of standardization associated with conventional analysis and correction of special service issues.

What are needed, therefore, are improved methods and systems for collection and communication of data for use in performing service on telecommunications systems. Such improved methods and systems are needed to overcome the previously discussed deficiencies associated with conventional service methods and systems.

SUMMARY

In one embodiment of the present methods and systems, a method is provided for processing data in association with an operation performed by a technician at a customer service location in a telecommunications system. The method includes transmitting data related to at least one piece of existing telecommunications equipment used in connection with the special service at the customer service location; communicating at least one alternative candidate for the existing telecommunications equipment through at least one graphical user interface to the technician at the customer service location; and, generating change data including at least one new candidate selected from a group of the alternative candidates for replacement of the existing telecommunications equipment at the customer service location. Computer-readable media embodiments of the present methods are also provided.

In another embodiment of the present methods and systems, a system is provided for processing data in association with an operation performed by a technician at a customer service location in a telecommunications system. At least one system embodiment includes components and software applications configured to perform the functions of various method embodiments for processing data in a telecommunications system.

BRIEF DESCRIPTION OF THE FIGURES

FIG. 4 is a process flow diagram showing one conventional embodiment of a method for collecting and processing information in connection with service performed in a telecommunications system;

FIG. 5 is a sample screen display of data obtained from a legacy system and/or administrative system of a telecommunications entity;

FIG. 6 is a sample screen display of data obtained from a legacy system and/or administrative system of a telecommunications entity;

FIG. 7 is a sample screen display of data obtained from a legacy system and/or administrative system of a telecommunications entity;

FIG. 8 is a sample screen display of data obtained from a legacy system and/or administrative system of a telecommunications entity;

FIG. 12 is a sample graphical user interface for use in association with collecting and processing information in a telecommunications system;

DETAILED DESCRIPTION

Figure 1:
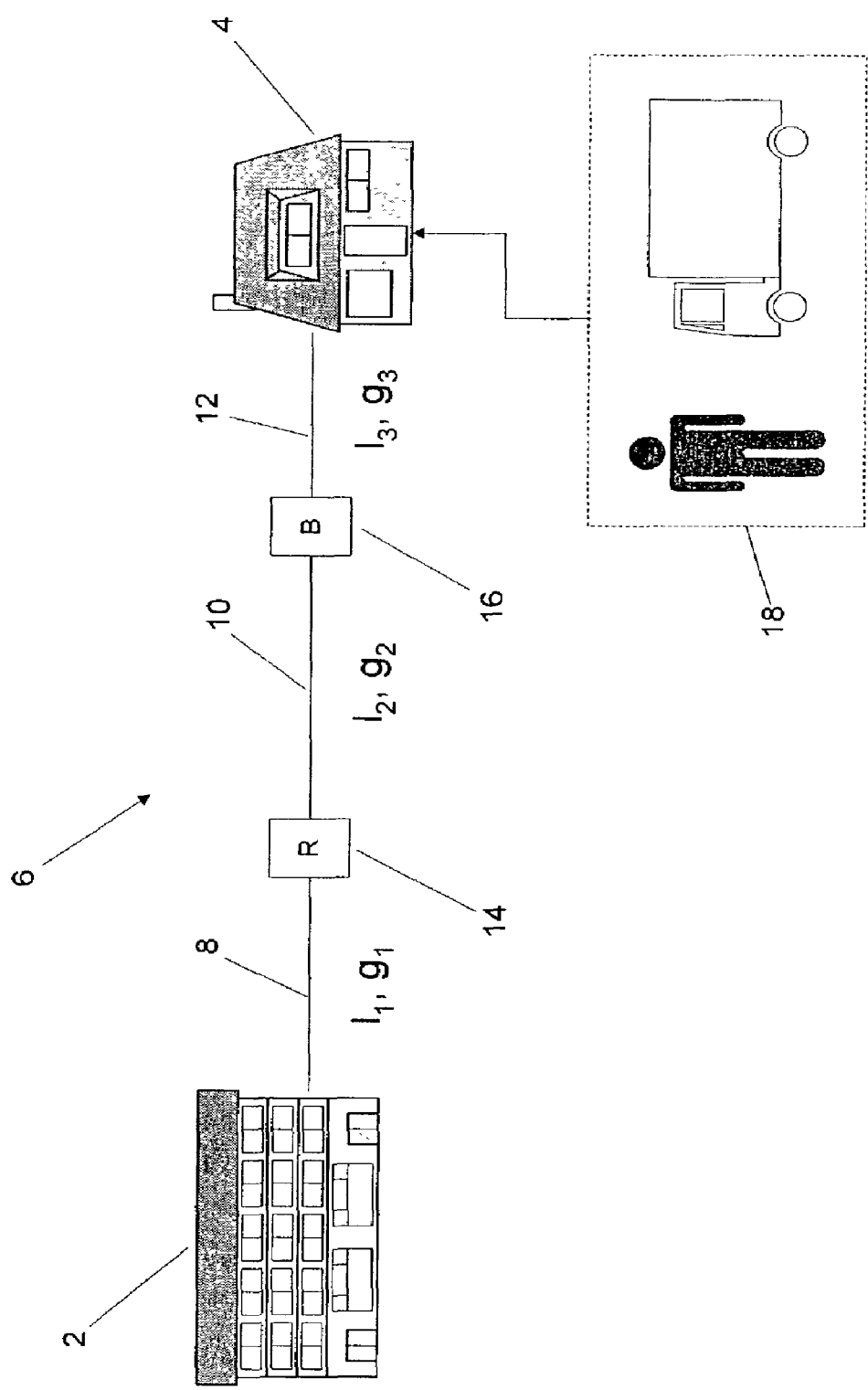
FIG. 1 is a schematic diagram illustrating a typical connection in a telecommunications system.
Figure 2:
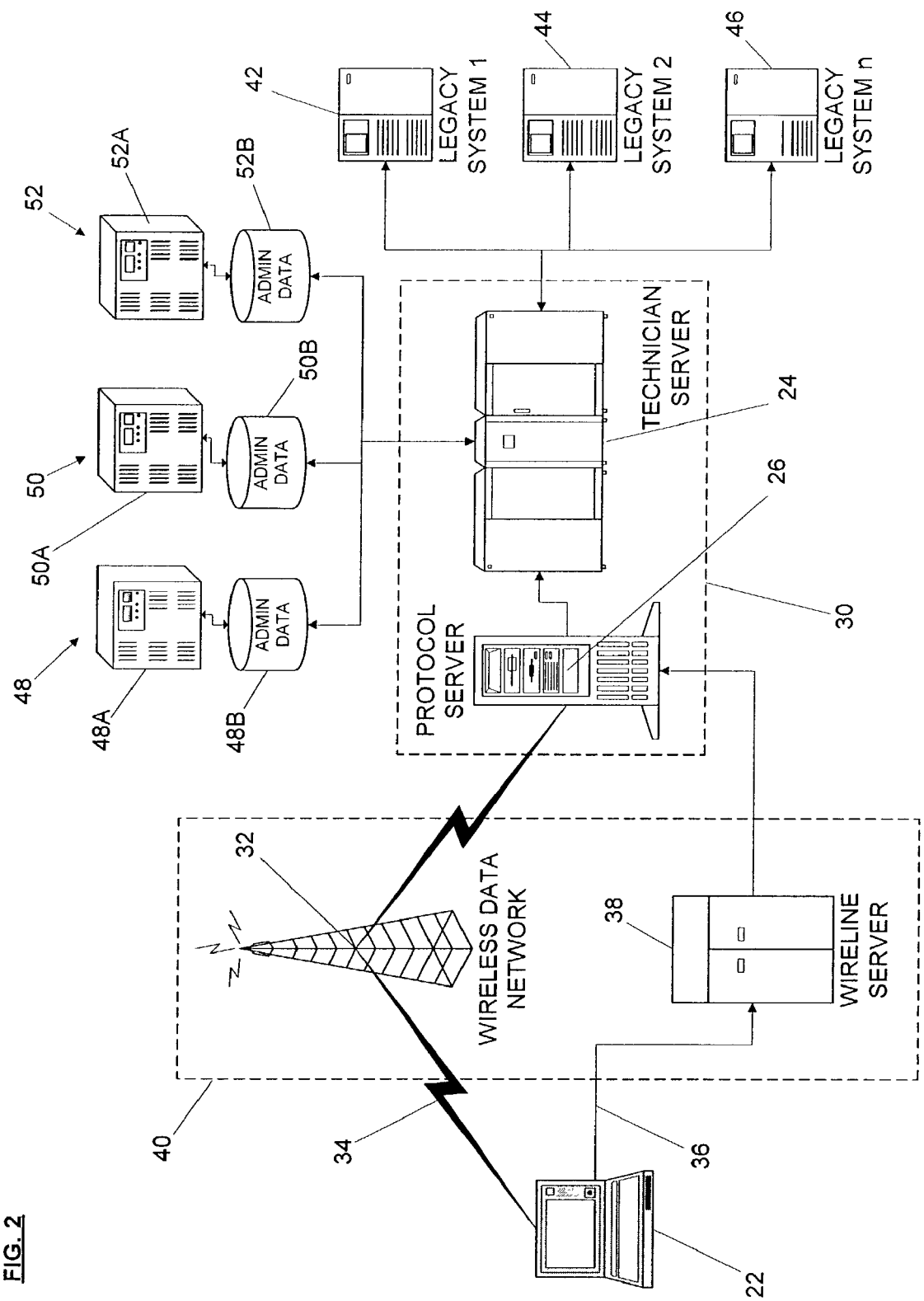
FIG. 2 is a schematic diagram depicting one embodiment of a system for collecting and processing information in a telecommunications system.
Figure 3:
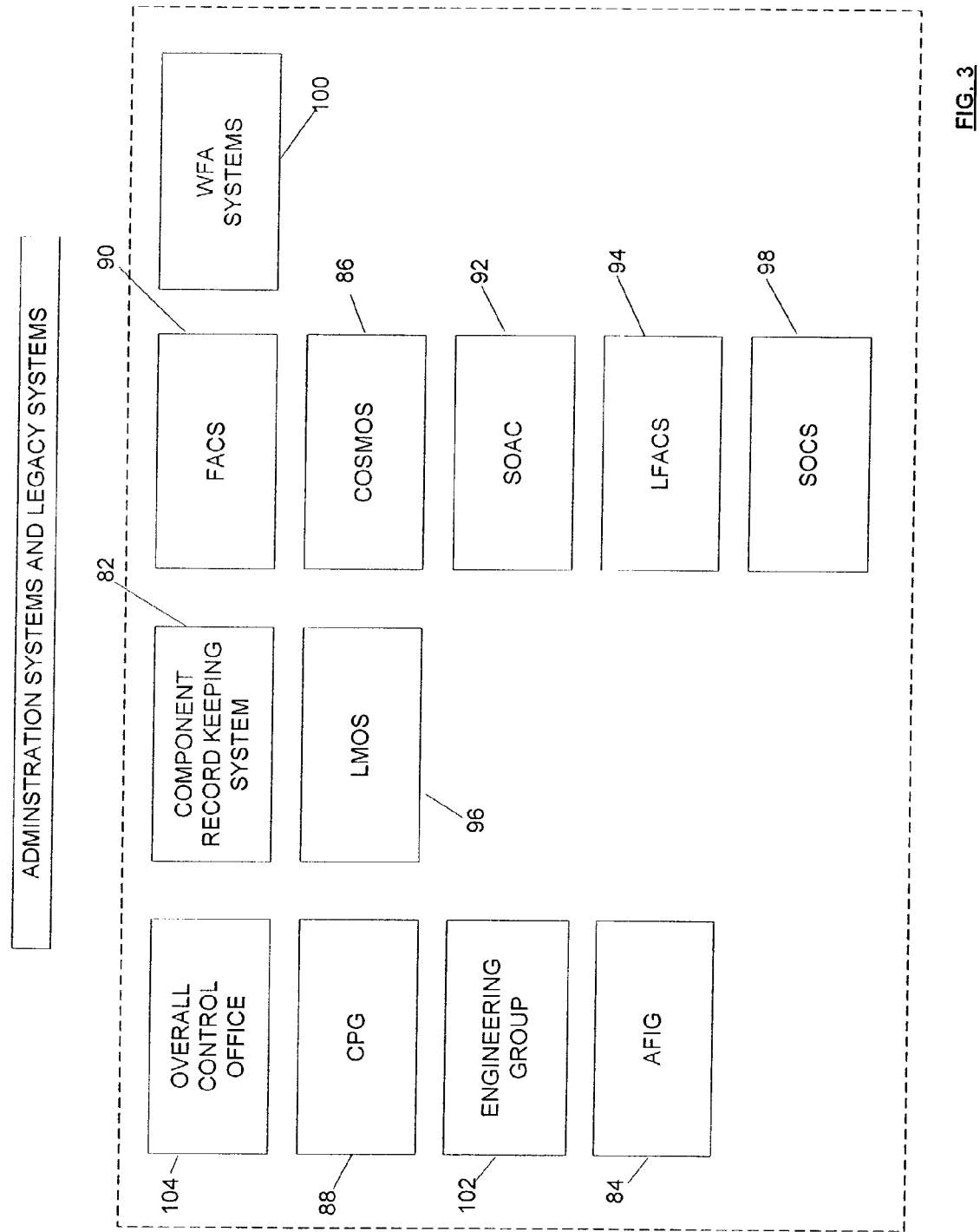
FIG. 3 is a schematic diagram depicting samples of legacy systems and administrative systems for use in accordance with one or more embodiments of the present methods and systems.
Figure 9A:
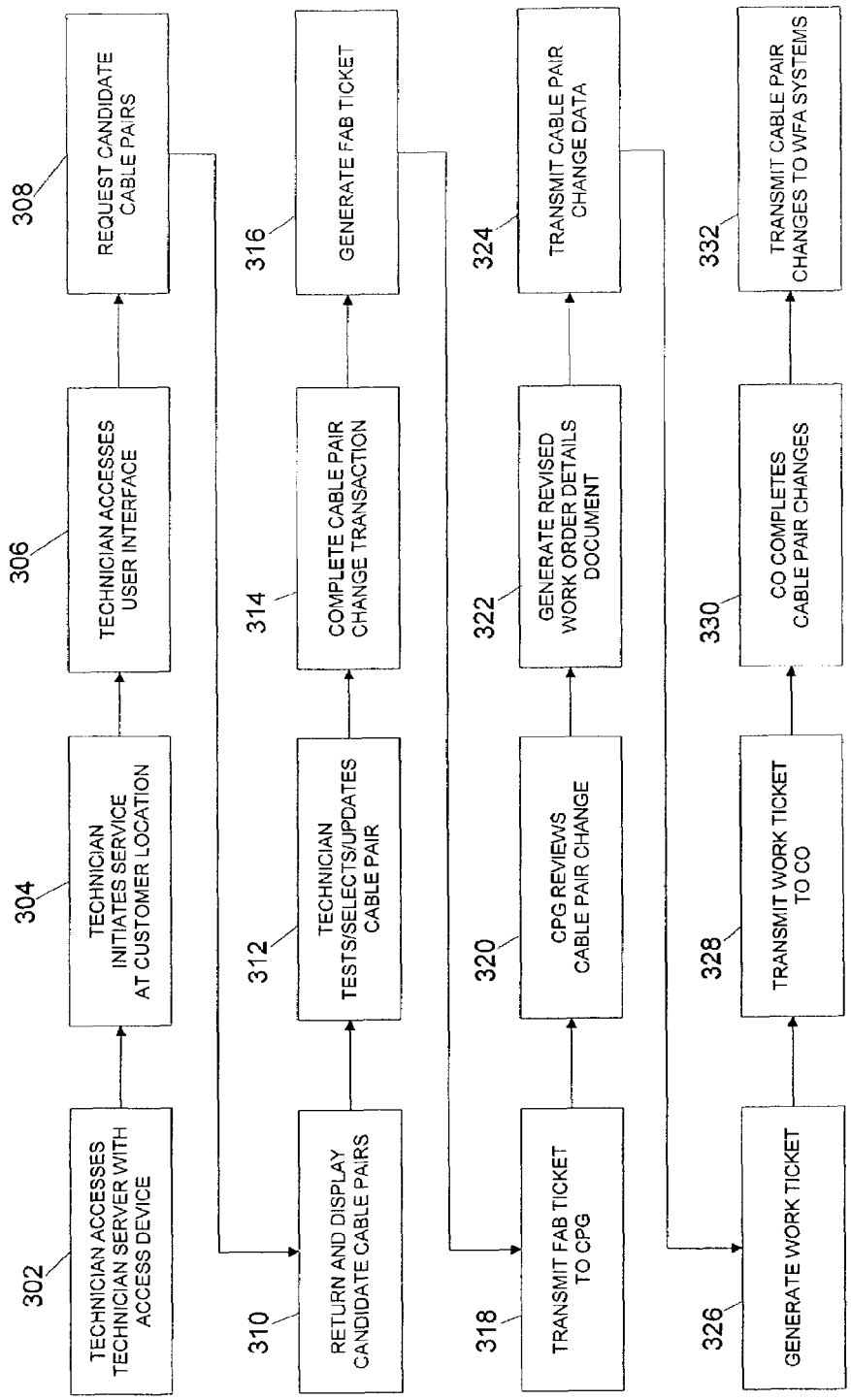
FIG. 9A is a process flow diagram showing one embodiment of a method for collecting and processing information in connection with maintenance service performed in a telecommunications system.
Figure 9B:
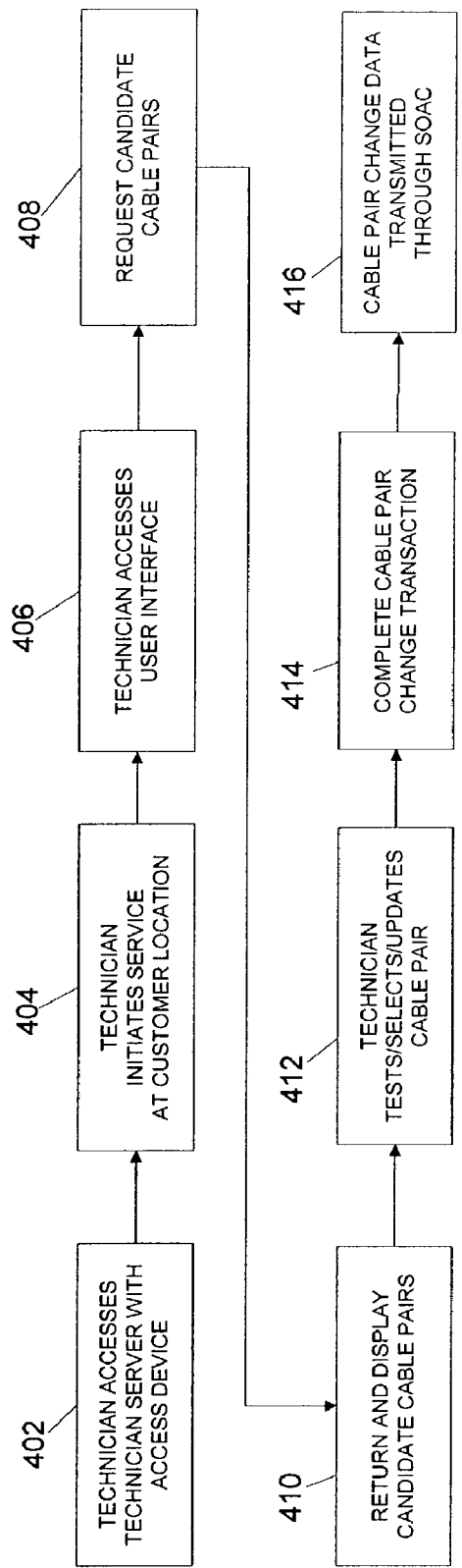
FIG. 9B is a process flow diagram showing one embodiment of a method for collecting and processing information in connection with installation service performed in a telecommunications system.

Referring now to FIGS. 2 and 3, a service technician working at a customer service location in a telecommunications system is provided with a technician access device 22. The access device 22 assists the technician in gathering, receiving and transmitting information related to service performed on telecommunications equipment.

The access device 22 can be, for example, a wireless personal computer, a laptop, a personal digital assistant (PDA), a wireless pager or any other device suitable for receiving and transmitting data associated with providing service at the customer service location. As used herein, a "computer" may be a microcomputer, minicomputer, laptop, personal data assistant, cellular phone, two-way pager, processor, or any computerized device capable of transmitting and receiving data over a shared network. The access device 22 can also be "ruggedized" (as that term is understood in the art) to resist physical damage during field service operations, for example.

In addition, the access device 22 can be a remote and portable computer used by the technician. The access device 22 can include memory for storing certain software applications used in obtaining and communicating data. The memory can be internal or external. The memory can also include any means for storing software, including a hard disk, an optical disk, floppy disk, ROM (read only memory), RAM (random access memory), PROM (programmable ROM), EEPROM (extended erasable PROM), and other like computer-readable media.

The access device 22 is also configured and programmed to permit the service technician to access a technician server 24. The technician server 24 functions as a transaction request broker between a protocol server 26 and one or more other systems operatively connected to the technician server 24. Collectively, the technician server 24 and the protocol server 26 can be considered a systems interface 30 for the system embodiment shown in FIG. 2. Access to the technician server 24 can be enabled through a wireless data network 32 through a radio frequency connection 34, for example. Access to the technician server 24 can also be enabled by a modem connection 36 to a wireline server 38, for example. The wireless data network 32 and the wireline server 38 can collectively be considered a communications network 40 for purposes of illustration and convenience of disclosure of the present methods and systems.

The communications network 40 may be any communications network that permits a computer to access a remote server. The communications network 40 can be a wireline network, wireless or cellular network, satellite network, and so forth. In one aspect of the present methods and systems, the communications network 40 is a Public Switched Telephone Network (PSTN) such as, for example, the BellSouth Communications Network (BSCN). The communications network 40 can also be a wireless communications network such as, for example, the trade-designated CINGULAR wireless network.

As shown in FIG. 2, the protocol server 26 receives and processes communications from the communications network 40. During operation of the access device 22 by a technician or other user, the protocol server 26 processes information transmitted from the access device 22 including, for example, user identification, passwords, radio serial numbers, access device serial numbers, and other data associated with the service technician performing service at a customer location. These and other types of data can be processed by the communications network 40 and the systems interface 30 through a number of legacy systems 42, 44, 46. These other data can include, for example, customer account number, signal decibel level, circuit number, signal response time, circuit test data, as well as many other types of data acquired from telecommunications equipment at the service location.

In general, the protocol server 26 provides a protocol and middleware interface between the access device 22 and the technician server 24. The protocol server 26 may receive user requests or other messages from the access device 22; route requests or messages to the technician server 24; receive responsive information from the technician server 24; and route responsive information back to the access device 22. In one embodiment of the present methods and systems, the protocol server 26 can include one or more NT servers running "NetTech" software from Broadbeam Corporation (Princeton, N.J.). In another embodiment, the technician server 24 can utilize UNIX operating system software executed on an Informix database management system. In another aspect, the protocol server 26 can include one or more WINDOWS NT servers (Microsoft Corporation) configured to assign one or more logical ports to transmissions received from the access device 22.

In one embodiment of the present methods and systems, the technician server 24 is provided in connection with the trade-designated "TECHNET" system. In another aspect of the present methods and systems, the technician server 24 can be a server having a "TECHACCESS" trade designation (Telcordia Technologies—Morristown, N.J.). In general, the technician server 24 can be a conventional server configured and programmed to verify and/or process information, including test data, received from the access device 22.

In general, the technician server 24 provides an interface to the legacy systems 42, 44, 46 from which responsive information can be retrieved. The technician server 24 may service requests, generate legacy transactions in connection with one or more of the legacy systems 42, 44, 46 in response to those requests, and receive responsive information to be forwarded back to the protocol server 26. In certain aspects of the present methods and systems, the legacy systems 42, 44, 46 are mainframe computer systems that maintain data for the telecommunications entity. According to one or more embodiments of the present methods and systems, the legacy systems 42, 44, 46 can include one or more of the following systems (samples of which are described hereinbelow): a loop facility assignment control system; a loop maintenance operations system; a computer system for mainframe operations; a mechanized loop testing system; a secure network element contract server; a mechanized time reporting system; a work activity statistical sampling plan system; and other similar systems.

In addition, one or more administration systems 48, 50, 52 can be operatively associated with the technician server 24. Each administration system 48, 50, 52 can include a server 48A, 50A, 52A and one or more databases 48B, 50B, 52B that contain information related to performing service at the customer location. Each database 48B, 50B, 52B can include a variety of information related to the technician, the equipment employed by the technician such as the access device 22, for example, and data related to numerous customer service locations and telecommunications equipment employed at the customer locations. Examples of data maintained in the administration systems 48, 50, 52 can include, without limitation, serial numbers of technician access devices; technician names; names of technician supervisors; maintenance center indicia; indicia associated with the version of software employed by access devices; user name and password information; telecommunications equipment information, and the like. In general, each administration system 48, 50, 52 includes hardware and software that interact with the technician server 24 to provide information to one or more technicians at one or more customer service locations.

As shown in FIG. 3, the following are illustrations of legacy systems 42, 44, 46 and administrative systems 48, 50, 52 that can be employed by a telecommunications entity in connection with the present methods and systems for data communication:

A component record keeping system 82 (e.g., a system provided in accordance with "TIRKS" of Telcordia Technologies) includes a mainframe computer system configured for recording and managing plant facility records that can be used for circuit design and special services in the telecommunications entity. In one embodiment, the component record keeping system 82 includes a computer-assisted inventory and assignment system containing records for facilities and circuits. The component record keeping system 82 supports circuit design and control, inventory record maintenance, selection and assignment of components, work order generation for installation and maintenance services, as well as various construction, planning, and forecasting functions.

The address facilities inventory group 84 ("AFIG") is a group within the telecommunications entity performing the primary function of establishing and maintaining network loop assignments for cable pairs. Additional functions of AFIG 84 include administration, inventory, and assignment for external plant and central office facilities.

The computer system for mainframe operations 86 ("COSMOS") includes a computer system for assisting the line and number administration system and frame control centers of the telecommunications entity with managing, controlling, and using main distribution frame and central office equipment, facilities, and circuits. In one aspect, COSMOS 86 may also maintain an inventory of central office facilities and respond to various requests to process information.

The circuit provisioning group 88 ("CPG") includes personnel for designing special service circuits in connection with the component record keeping system 82. Functions of CPG 88 include interoffice facility assignment, transmission and signaling equipment placement, generation of test data, trunk group assignment, switch trunk translations, and other like functions. In one aspect, CPG 88 provides output information for a word order record details document that is used by the central office and technicians to construct and maintain circuits.

The facility assignment and control system 90 ("FACS") includes an integrated network of component systems designed to process the assignment of service orders and to support AFIG 84. FACS 90 includes a distributed system for the management of plant assignments and the inventory of cable facilities. FACS 90 can operate in connection with one or more of the following systems: service order analysis and control 92 ("SOAC"); loop facilities assignment and control system 94 ("LFACS"); and COSMOS 86. For example, SOAC 92 administers and controls the service order flow; LFACS 94 inventories and assigns outside plant facilities; and, SOAC 92 interacts with COSMOS 86 to obtain assignments for central office facilities. AFIG 84, for example, depends on FACS 90 to support installation activities and central office facilities changes. Maintenance centers of the telecommunications entity use FACS 90 when processing customer trouble reports that require changes to external plant facilities. FACS 90 also is the vehicle for the Facilities Assignment Specialist ("FAS") to prepare and process engineering work orders.

A loop maintenance operations system 96 ("LMOS") includes functions and storage for loop assignments including means for maintaining customer line records and for entering, processing, and tracking trouble reports. In one aspect, LMOS 96 can be embodied as a system marketed and sold under the "AT&T" trade designation.

A service order communication system 98 ("SOCS") includes a legacy control system that assists with collection, storage, processing, and distribution of service orders to various departments within the telecommunications entity. In one embodiment, SOCS 98 is the primary system for controlling service order creation and distribution.

One or more work and force administration systems 100 ("WFA" systems, e.g., systems provided under the "Telcordia Technologies" trade designation) include hardware and software applications that help manage tasks and coordinate personnel assignments required to install and repair portions of a telecommunications system, including facilities trunks special service circuits and residential lines. WFA systems 100 manage and automate information required to install and repair facilities, trunks, special services, business/residential lines and other services. WFA systems 100 can be used to coordinate and track installation and maintenance activities of a telecommunications circuit from order to service completion. WFA systems 100 can provide access to detailed circuit records and circuit history data. In one aspect, WFA systems 100 can be employed to automate work assignments for central office technicians in association with service operations for designed circuits, non-designed circuits, and POTS type services.

Referring now to FIGS. 2 and 3, a user of the access device 22, such as a technician, can access the systems interface 30 through the communications network 40. The technician may log in through the protocol server 26 to the technician server 24 using a user name and other data, such as a password and/or primary host group address. Once the technician has been authenticated as a legitimate user of the access device 22, a "TECHNET" session can be established and the access device 22 can be connected through the communications network 40 to the systems interface 30. The systems interface 30 permits the access device 22 to make requests for information from the legacy systems 42, 44, 46. The user can make the requests by entering commands into the access device 22 that are input to the systems interface 30. After receiving input commands, the systems interface 30 processes the inputs to generate user requests and generate legacy transactions based on the user requests, receive information from the legacy systems 42, 44, 46, and transmit the information back to the access device 22. In addition, one or more of the administration systems 48, 50, 52 can interact with the access device 22 such as, for example, to verify user name and password information or to transmit information to the access device 22.

The access device 22 can include software that executes a client application for accessing the systems interface 30. In one aspect, the access device 22 executes the client application of the trade-designated "TECHNET" client application. The "TECHNET" client application includes a graphical user interface (GUI) layer that provides a user interface for receiving requests for information from the user, displaying information retrieved from the legacy systems 42, 44, 46, displaying information transmitted by one or more of the administration systems 48, 50, 52, and other user interface tasks. A technician can make the requests by keyboard entry of inputs, for example, to the client GUI included with the access device 22. The technician can select a particular operation such as, for example, "Retrieve Customer Information" by using the client application on the access device 22. In operation, the access device 22 can also interact with one or more of the administration systems 48, 50, 52 to obtain data related to service performed at a customer location.

Referring now to FIGS. 2 through 8, in one embodiment of a conventional method and system for performing service on telecommunications equipment, a service technician initiates service in step 202 for a cable pair on a designed circuit at a customer location for which maintenance and/or installation services are required. In step 204, the technician can test one or more alternative candidate cable pairs to determine which cable pair can be used to replace the current cable pair. In another aspect, prior to the technician testing alternative cable pairs, the technician can communicate with LFACS 94 by telephone in step 206 to identify candidate cable pairs that are available and suitable to replace the existing cable pair. One criterion of availability/suitability can include a determination of whether a candidate cable pair is loaded or unloaded. A facility assignment specialist ("FAS") associated with LFACS 94 may assist the technician with determining the availability of the cable pair selected and tested by the technician and/or with identifying other candidate cable pairs.

When the technician communicates with LFACS 94, the FAS queries LFACS 94 in step 208 by invoking an inquiry screen (see FIG. 5) and completing a command option line on the screen. As shown, the "INQ" designation is the inquiry type, which is facility assignment ("FASG") in this example. The designation "EMP=HC" includes the initials of the service technician. The designation "WC" represents a wire center associated with the telecommunications entity (i.e., "LNO" represents "Local New Orleans" wire center). The designation "CKID" is a circuit identifier (i.e., shown as "60.PLPC.503186..SC") for the circuit associated with the customer location that needs an alternative cable pair installed or replaced. The designation "TID" is a terminal identifier (i.e., shown as "CKL 1") associated with the circuit for which service is required. As shown on the screen, the circuit identified for service is located at 365 Canal Street in New Orleans, La.

In connection with querying LFACS 94, the FAS and the technician may collaborate to identify one or more appropriate candidate cable pairs in step 210 that can be used for the service operation. Using information from the screen (FIG. 5), the FAS can enter a "command option" on a menu screen (see FIG. 6) to generate a maintenance change ticket (see FIG. 7) for the service operation. As shown in FIG. 6, the information entered by the FAS in connection with the command option includes the designation "MCT LP"; the service technician's initials (i.e., "EMP=HC"); the wire center (i.e., "WC=LNO"); and designations for the present/defective cable pair and its associated bonding post (i.e., "CA=80,PR=599"). The maintenance change ticket provides a list of candidate cable pairs that may be used by the service technician for the special service operation at the customer location. Information on the candidate pairs can include, for example, a designation for the status (i.e., "CF" represents a connected facility and "SPR" represents a spare); a cable designation ("86"); a pair number (e.g., "3520"); and, a binding post designation (e.g., "4420"). Other data that can be displayed on the maintenance change ticket include loaded/unloaded status, loop makeup, the date the cable pair became a part of the connected facility, and the connected facility (e.g., "365-7.4B Canal Street"). Candidate cable pairs may be displayed in groups, but if none of the displayed candidates are deemed acceptable, the FAS can select "moreprs" to display another group of candidate cable pairs on the screen.

On the maintenance change ticket (see FIG. 7), the FAS can enter a reason for the cable pair change (e.g., by entering "FCR" for change reason followed by "OPN" for open circuit or "SHT" for short circuit). Through collaboration of the service technician and the FAS, a suitable cable pair listed on the maintenance change ticket can be selected. A "cut change number" or "ticket number" can be entered in the "ctt" field prior to completion and further processing of the maintenance change ticket. The "ctt" ticket number can be, for example, a name, a trunk number, technician identification number, or a reasonable combination of this information. In one aspect, the first name of the service technician can be used with initials of the FAS followed by a sequential number for maintenance change tickets issued for that technician on a specific day (e.g., "SamHC1", "SamHC2", and so forth).

Upon execution, the maintenance change ticket is transmitted in step 212 to the component record keeping system 82. The component record keeping system 82 can provide information on the special service operation in the form of an electronic or hard copy report transmitted to CPG 88. In addition, the completed maintenance change ticket may be sent to SOCS 98 in step 214, if the service operation is pursuant to an installation type procedure; or to LMOS 96 in step 216, if the service operation is pursuant to a maintenance operation or other corrective type procedure.

Once the service technician completes work with the FAS to test a candidate cable pair or pairs and determine which candidate pair to use, the technician contacts AFIG 84 by telephone in step 218. The telephone communication with AFIG 84 can include a request by the technician to change the assignment of the candidate cable pair. The technician may also communicate with an engineering group 102 in step 220. The engineering group 102 updates the provisioning documentation associated with the cable pair and sends the updated documentation to CPG 88 for further processing in step 222.

Figures 7, 8:
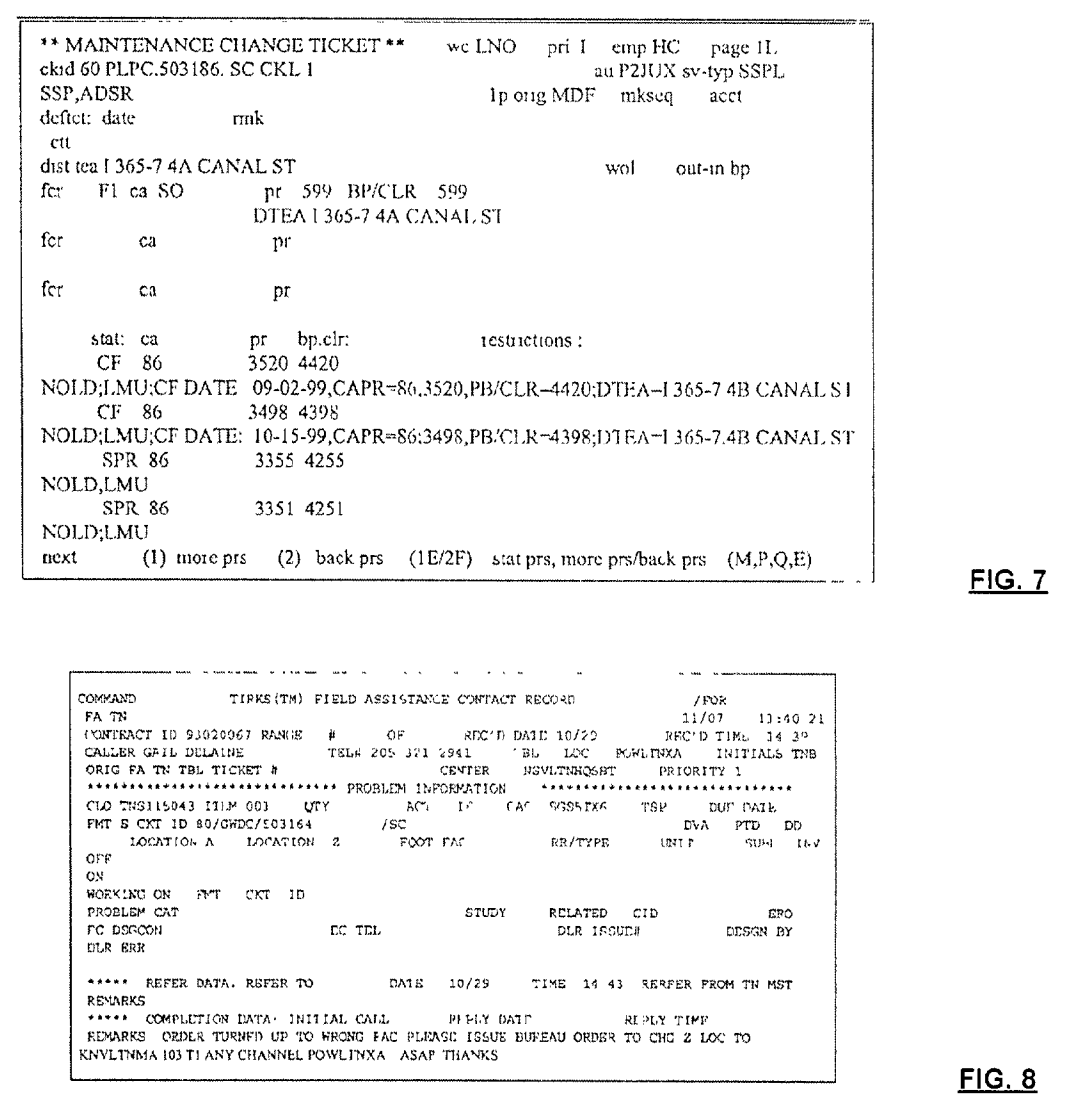

In addition, the technician may place a telephone call to an overall control office 104 ("OCO") in step 224 to have a field assistance bureau ticket (herein "FAB ticket" or "TFAS ticket") generated and issued in step 226 that directs the OCO 104 to connect the new cable pair. An example of a FAB ticket is shown in FIG. 8. The OCO 104 issues and tracks the FAB ticket to ensure service completion and to promote any needed updates to one or more of the legacy systems. The FAB ticket is also used for generation of a revised work order record details document that reflects changes associated with the service operation. In one aspect, the FAB ticket can also be made available for access by the service technician.

Provisioning specialists in CPG 88 are then assigned to resolve the FAB ticket received by CPG 88 in step 228. The speed of response to the FAB ticket typically depends on the total volume of tickets that are processed by CPG 88 at a particular time. CPG 88 performs transactions that generate and transmit the revised work order details document in step 230 to the component record keeping system 82. The component record keeping system 82 transmits information in step 232, including any changes associated with the service operation, to one or more of the WFA systems 100. The WFA systems 100 may communicate with the service technician in step 234 to finalize completion of the cable pair service operation at the customer location.

It can be appreciated that the foregoing described conventional method and system involves a significant amount of telephone communication between/among the service technician and various systems and groups within the telecommunications entity. To the extent that such telephone communications can be reduced or eliminated, it is believed that increased productivity, enhanced data integrity, and improved training procedures, among other benefits, can be realized by the telecommunications entity.

Referring now to FIGS. 2 through 9A, in one embodiment of the present methods and systems, a technician accesses the technician server 24 in step 302 at a customer location using the access device 22 to perform a maintenance or repair service at the customer location. In one aspect of the present methods and systems, the maintenance or repair service is performed in association with a "trouble ticket" generated and processed through the systems of the telecommunications entity. The technician proceeds to initiate the maintenance or repair service required at the customer location in step 304. In one aspect, this service includes one or more maintenance or repair operations performed on a special service. A special service may include work performed, for example, on a cable pair operatively associated with a high-speed data transmission service such as HDSL service.

Figure 10:
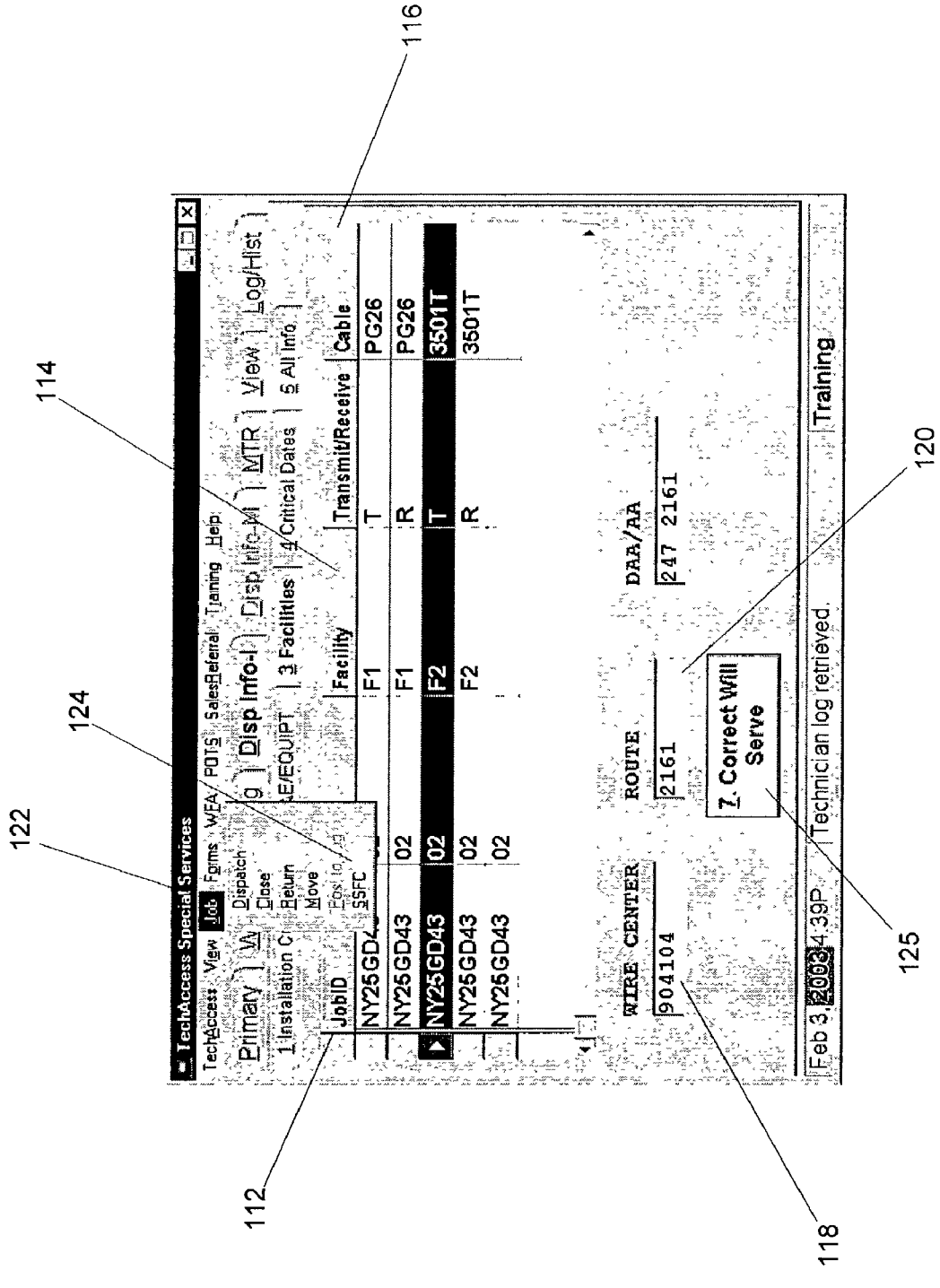
FIG. 10 is a sample graphical user interface for use in association with collecting and processing information in a telecommunications system.

As shown in the illustrative screen display of FIG. 10, the user can access a special service portion of the "TechAccess" client application, for example, through a graphical user interface in step 306. In one aspect, this and other graphical user interfaces (described hereinafter) can be embodied as software applications operatively associated with the access device. The screen display of FIG. 10 includes information about various maintenance/repair and/or installation/service order jobs listed by order number 112 ("JobID"), including Facility 114 (e.g., "F2"), Cable 116 (e.g., "3501T"), Wire Center 118 (e.g., "904104"), and Route 120 (e.g., "2161"), among other information. The technician can select "Job" 122 from a menu listing and then select "SSFC" 124 from a drop-down menu. This selection results in presentation of the screen display of FIG. 11 to the technician. When the "Request Candidate Pairs" button 126 is selected by the technician, the screen display of FIG. 12 can be displayed to the technician. The screen of FIG. 12 enables the technician to input the facility assignment of the cable pair for which service is performed at the customer location. In the example shown, a circuit 132 identified as "52/XHGS/702488/SB" is assigned to cable designation 134 of "3501T", pair designation 136 of "0797" with an "NY25GD43" order number 138.

If the "OK" button 140 is pressed in the graphical user interface of FIG. 12, the system sends a transaction to LFACS 94 in step 308 to request candidate cable pairs suitable for use as replacement pairs at the customer location. If the current service operation is a maintenance or repair type operation, the system formats and submits an "MCT LP" request, for example, to LFACS 94 to obtain one or more candidate pairs. The candidate cable pairs are then presented in step 310 for viewing by the technician on the "Candidate Pairs" portion 128 of the screen display (see FIG. 11). As discussed above, in one aspect of the present methods and systems, a list of candidate cable pairs can include one or more available candidate pairs that are not loaded and that have an associated loop makeup. In generating a list of candidate cable pairs, LFACS 94 determines the suitability of a given cable pair by determining, for example, whether it is loaded or unloaded by a load coil, among other applicable criteria.

Figure 11:
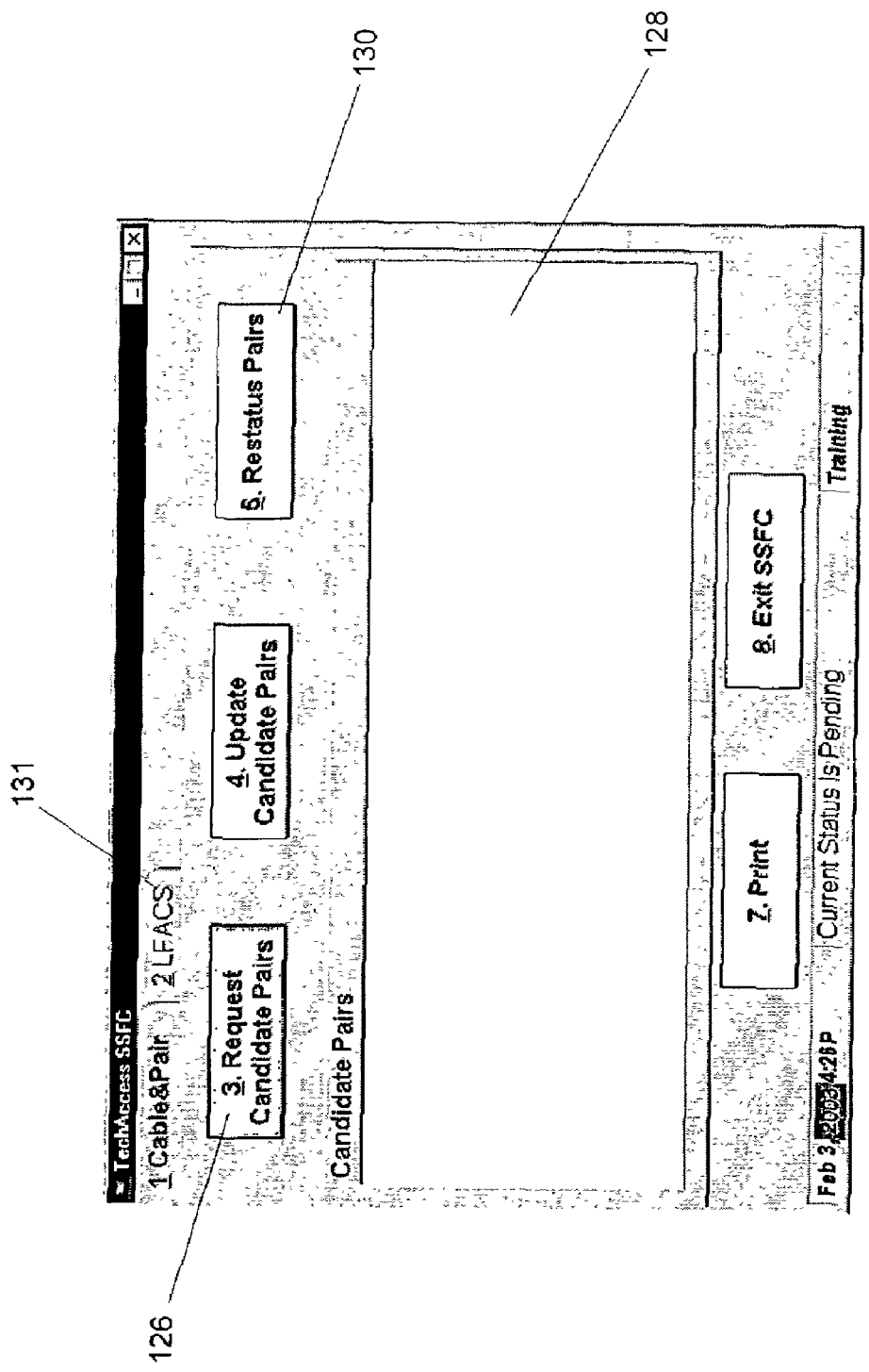
FIG. 11 is a sample graphical user interface for use in association with collecting and processing information in a telecommunications system.

In one illustrative aspect of the present methods and systems, when data from the "MCT LP" request are returned by the LFACS 94 in step 310, the system populates a tabular view of the available candidate cable pairs in the display 128 of FIG. 11. The following data, for example, can be included within this tabular view for each candidate cable pair record: a facility indication, a cable indication, a pair indication, a pair status indication, a circuit identification, a binding post indication, a pair loading status (e.g., a "Yes" or "No" indication), a loop makeup status (e.g., a "Yes" or "No" indication), and other appropriate information.

Figure 13:
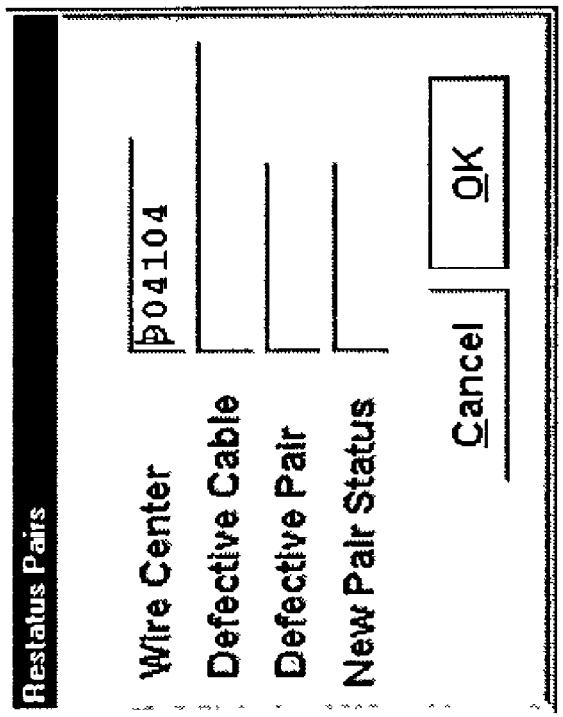
FIG. 13 is a sample graphical user interface for use in association with collecting and processing information in a telecommunications system; and, FIG. 14 is a sample graphical user interface for use in association with collecting and processing information in a telecommunications system.
Figure 14:
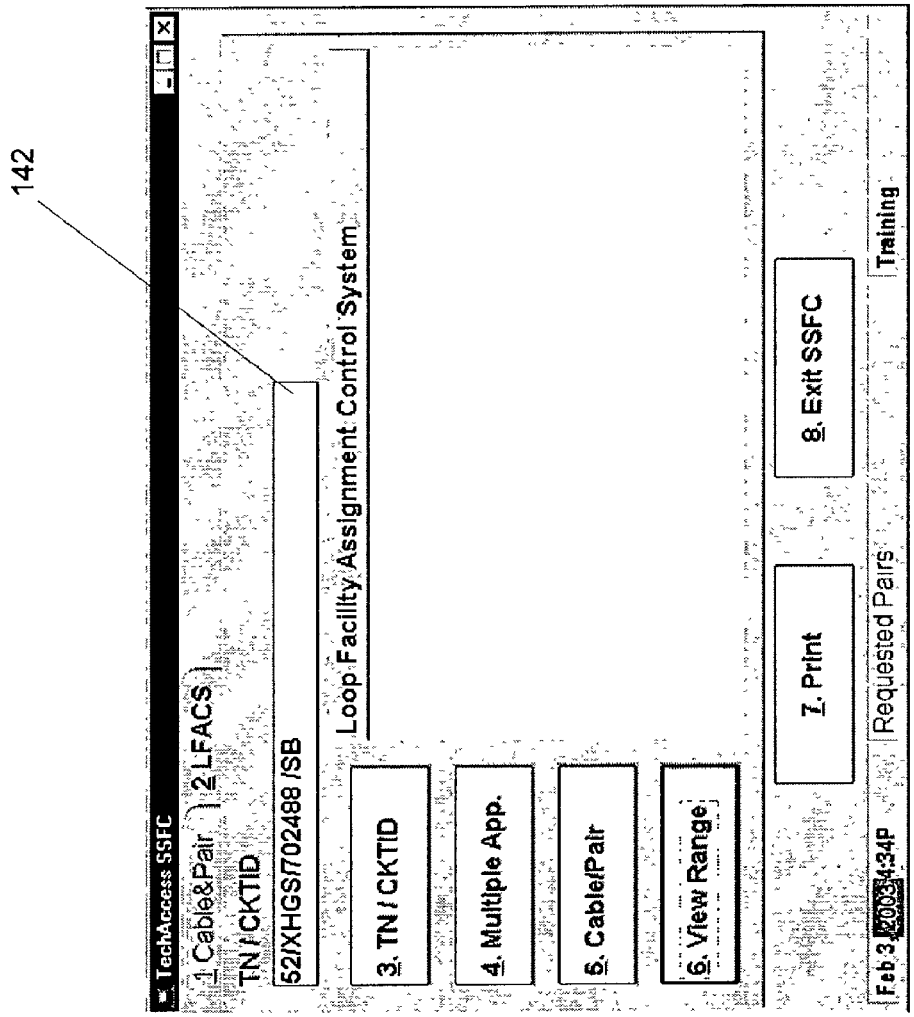

In another aspect of the present methods and systems, the screen display of FIG. 13 is presented to the technician when the "Restatus Pairs" button 130 on the screen display of FIG. 11 is pressed. This display of FIG. 13 permits the technician to change the status of a given cable pair in the LFACS 94 records. In another aspect, selecting the "LFACS" tab 131 in the screen display of FIG. 11 provides the screen display of FIG. 14. As shown in FIG. 14, the technician can query LFACS 94 records by entering, for example, the circuit identification or telephone number in a data entry field 142 on the screen. In another aspect, the technician may discover that the serving terminal address for a given piece of telecommunications equipment is not the same as that determined by LFACS 94. If the serving terminal address does contain the pair indicated by LFACS 94, the technician can update LFACS 94 to correct the "will serve" terminal address by pressing the "Correct Will Serve" button 125 in the screen display of FIG. 10.

The technician tests, selects and updates an available cable pair in step 312. In one aspect, the technician may use a test set such as one provided in connection with a "TechNet/TechAccess" computer system. The test set can be an integrated test set that enables tests of telecommunications equipment to be performed by the user. In one embodiment, the test set can be one provided by TTC (a related company of Itronix of Spokane, Wash.). In another aspect, the test set is equipped with a combination of wireless software/hardware that enables wireless communications such as, for example, between the access device and the test set.

In step 314, the "MCT LP" transaction is completed in connection with the operation of the LFACS 94 to reflect changes required by the cable pair selected in step 312. A Field Assist Bureau ticket ("FAB ticket") is generated in step 316 in association with operation of the LFACS 94 and the changes required by the cable pair selection. In one aspect, the present methods and systems may generate substantially automatically the FAB ticket in connection with operation of the LFACS 94.

The FAB ticket is transmitted in step 318 to the CPG 88 by a conventional wireline or wireless communication method and/or system such as, for example, by telephone, facsimile, wireless pager, and the like. In step 320, personnel associated with the CPG 88 review details associated with the cable pair change, review one or more loop make-ups, and/or perform an analysis to determine what changes, if any, should be implemented in the circuit design. The FAB ticket can be assigned to a provisioning specialist in CPG 88 who reviews the proposed cable pair change and revises the circuit design corresponding to the pair change. In one aspect, CPG 88 generates a revised work order record details document in step 322 that reflects changes required by the cable pair change of step 312. If the proposed cable pair change is processed and resolved by the CPG 88, the cable pair change data are transmitted in step 324 in the form of the revised work order record details document to one or more WFA systems 100, an engineering group within the telecommunications entity, and other groups and/or systems within the telecommunications entity.

In step 326, the WFA systems 100 generate a work ticket containing data related to the cable pair change. In step 328, the work ticket is transmitted to the CO to effect changes required by the cable pair change. In step 330, a technician associated with the CO completes the changes required by the cable pair change. Data related to the cable pair change are then processed and updated through one or more of the WFA systems 100 in step 332.

Referring now to FIGS. 2 through 9B, in one embodiment of the present methods and systems, a technician accesses the technician server 24 in step 402 at a customer location using the access device 22 to perform an installation related service at the customer location. In one aspect of the present methods and systems, the installation service is performed in association with a service order generated and processed through the systems of the telecommunications entity. The technician proceeds to initiate the installation service required at the customer location in step 404. In one aspect, this service includes one or more installation or service order operations performed on a special service. A special service may include work performed, for example, on a cable pair operatively associated with a high-speed data transmission service such as HDSL service.

As shown in the illustrative screen display of FIG. 10, the user can access a special service portion of the "TechAccess" client application, for example, through a graphical user interface in step 406. In one aspect, this and other graphical user interfaces (described hereinafter) can be embodied as software applications operatively associated with the access device. The screen display of FIG. 10 includes information about various maintenance/repair and/or installation/service order jobs listed by order number 112 ("JobID"), including Facility 114 (e.g., "F2"), Cable 116 (e.g., "3501T"), Wire Center 118 (e.g., "904104"), and Route 120 (e.g., "2161"), among other information. The technician can select "Job" 122 from a menu listing and then select "SSFC" 124 from a drop-down menu. This selection results in presentation of the screen display of FIG. 11 to the technician. When the "Request Candidate Pairs" button 126 is selected by the technician, the screen display of FIG. 12 can be displayed to the technician. The screen of FIG. 12 enables the technician to input the facility assignment of the cable pair for which service is performed at the customer location. In the example shown, a circuit 132 identified as "52/XHGS/702488/SB" is assigned to cable designation 134 of "3501T", pair designation 136 of "0797" with an "NY25GD43" order number 138.

If the "OK" button 140 is pressed in the graphical user interface of FIG. 12, the system sends a transaction to LFACS 94 in step 408 to request candidate cable pairs suitable for use as replacement pairs at the customer location. If the current service operation is an installation or service order type of operation, the system formats and submits a "CHG LASG" request, for example, to LFACS 94 to obtain one or more candidate pairs. The candidate cable pairs are then presented in step 410 for viewing by the technician on the "Candidate Pairs" portion 128 of the screen display (see FIG. 11). As discussed above, in one aspect of the present methods and systems, a list of candidate cable pairs can include one or more available candidate pairs that are not loaded and that have an associated loop makeup. In generating a list of candidate cable pairs, LFACS 94 determines the suitability of a given cable pair by determining, for example, whether it is loaded or unloaded by a load coil, among other applicable criteria.

In one illustrative aspect of the present methods and systems, when data from the "CHG LASG" request are returned by the LFACS 94 in step 410, the system populates a tabular view of the available candidate cable pairs in the display 128 of FIG. 11. The following data, for example, can be included within this tabular view for each candidate cable pair record: a facility indication, a cable indication, a pair indication, a pair status indication, a circuit identification, a binding post indication, a pair loading status (e.g., a "Yes" or "No" indication), a loop makeup status (e.g., a "Yes" or "No" indication), and other appropriate information.

In another aspect of the present methods and systems, the screen display of FIG. 13 is presented to the technician when the "Restatus Pairs" button 130 on the screen display of FIG. 11 is pressed. This display of FIG. 13 permits the technician to change the status of a given cable pair in the LFACS 94 records. In another aspect, selecting the "LFACS" tab 131 in the screen display of FIG. 11 provides the screen display of FIG. 14. As shown in FIG. 14, the technician can query LFACS 94 records by entering, for example, the circuit identification or telephone number in a data entry field 142 on the screen. In another aspect, the technician may discover that the serving terminal address for a given piece of telecommunications equipment is not the same as that determined by LFACS 94. If the serving terminal address does contain the pair indicated by LFACS 94, the technician can update LFACS 94 to correct the "will serve" terminal address by pressing the "Correct Will Serve" button 125 in the screen display of FIG. 10.

The technician tests, selects and updates an available cable pair in step 412. In one aspect, the technician may use a test set such as one provided in connection with a "Tech-Net/TechAccess" computer system. The test set can be an integrated test set that enables tests of telecommunications equipment to be performed by the user. In one embodiment, the test set can be one provided by TTC (a related company of Itronix of Spokane, Wash.). In another aspect, the test set is equipped with a combination of wireless software/hardware that enables wireless communications such as, for example, between the access device and the test set.

In step 414, the "CHG LASG" transaction is completed in connection with the operation of the LFACS 94 to reflect changes required by the cable pair selected in step 412. In step 416, the changes required by the cable pair change are transmitted through the SOAC 92 and optionally through one or more other systems of the telecommunications entity.

In other aspects of the present methods and systems, users are provided with visual and/or auditory notification of certain events including, for example, a successful cable pair change, an unsuccessful cable pair change, and the like. In certain embodiments of the present methods and systems, the technician possesses the capability to print, fax, e-mail or otherwise electronically, wirelessly or wireline transmit data associated with a special service operation.

The benefits of the present methods and systems for performing installation and maintenance operations in a telecommunications system are readily apparent. The present methods and systems provide communication of data without substantial telephone communication with the various administrative systems of a telecommunications entity. The present methods and systems also offer a technician performing a special service operation, for example, the capacity to request candidate cable pairs from a remote location. These features can reduce or eliminate the loss of productive time inherent in telephone communications between the technician and the telecommunications entity. These features also reduce the possibility of errors, improve the data integrity of various legacy and administrative systems, and standardize and simplify training for technicians.

The term "computer-readable medium" is defined herein as understood by those skilled in the art. It can be appreciated that various method steps described herein may be performed, in certain embodiments, using instructions stored on a computer-readable medium or media that direct a computer system to perform the method steps. A computer-readable medium can include, for example, memory devices such as diskettes, compact discs of both read-only and writeable varieties, optical disk drives, and hard disk drives. A computer-readable medium can also include memory storage that can be physical, virtual, permanent, temporary, semi-permanent and/or semi-temporary. A computer-readable medium can further include one or more data signals transmitted on one or more carrier waves.

It can be appreciated that, in some embodiments of the present methods and systems disclosed herein, a single component can be replaced by multiple components, and multiple components replaced by a single component, to perform a given function. Except where such substitution would not be operative to practice the present methods and systems, such substitution is within the scope of the present methods and systems.

Examples presented herein are intended to illustrate potential implementations of the present telecommunication method and system embodiments. It can be appreciated that such examples are intended primarily for purposes of illustration. No particular aspect or aspects of the example method and system embodiments described herein are intended to limit the scope of the present invention.

Whereas particular embodiments of the invention have been described herein for the purpose of illustrating the invention and not for the purpose of limiting the same, it can be appreciated by those of ordinary skill in the art that numerous variations of the details, materials and arrangement of parts may be made within the principle and scope of the invention without departing from the invention as described in the appended claims.

What is claimed is:

1. A method for processing data in association with an operation performed by a technician at a customer service location in a telecommunications system, the method comprising:
    transmitting, from the customer service location to a technician server at a location remote from the customer service location, data related to at least one piece of existing telecommunications equipment being used in connection with a special service at the customer service location;
    communicating data from the technician server to a component record keeping system including at least one computer system maintaining equipment data for the telecommunications system;
    communicating from the technician server to the customer service location at least one alternative candidate, obtained from the communication with the component record keeping system, for the existing telecommunications equipment through at least one graphical user interface to the technician at the customer service location;
    generating change data including at least one new candidate selected from a group of the alternative candidates for replacement of the existing telecommunications equipment at the customer service location; and
    communicating the change data to the component record keeping system for updating the telecommunications equipment data maintained thereon.

2. The method of claim 1, wherein the special service includes a high-speed data transmission service.

3. The method of claim 1, wherein the telecommunications equipment includes at least one cable pair.

4. The method of claim 1, further comprising accessing the graphical user interface for generating a list of the alternative candidates.

5. The method of claim 1, further comprising communicating with the technician server through an access device of the technician at the customer service location.

6. The method of claim 1, further comprising testing at least one of the alternative candidates prior to generating the change data.

7. The method of claim 1, further comprising generating at least one maintenance change document in connection with generating the change data.

8. The method of claim 1, wherein communicating the change data to the component record keeping system comprises communicating the change data to at least one legacy system of the telecommunications system.

9. The method of claim 1, wherein communicating the change data to the component record keeping system comprises communicating the change data to at least one administrative system of the telecommunications system.

10. A system for processing data in association with an operation performed by a technician at a customer service location in a telecommunications system, the system comprising:
    means for transmitting data from the customer service location to a technician server at a location remote from the customer service location, related to at least one piece of existing telecommunications equipment being used in connection with a special service at the customer service location;
    means communicating data from the technician server to a component record keeping system including at least one computer system maintaining telecommunications equipment data for the telecommunications system;
    means for communicating at least one alternative candidate, obtained from the communication with the component record keeping system, for the existing telecommunications equipment through user interface means, from the technician server to the technician at the customer service location;
    means for generating change data including at least one new candidate selected from a group of the alternative candidates for replacement of the existing telecommunications equipment at the customer service location; and
    means communicating the change data to the component record keeping system for updating the telecommunications equipment data maintained thereon.

11. The system of claim 10, wherein the special service includes a high-speed data transmission service.

12. The system of claim 10, wherein the telecommunications equipment includes at least one cable pair.

13. The system of claim 10, further comprising means for accessing the user interface means to generate a list of the alternative candidates.

14. The system of claim 10, further comprising means for testing at least one of the alternative candidates.

15. The system of claim 10, further comprising means for generating at least one maintenance change document in connection with the means for generating the change data.

16. The system of claim 10, wherein the means for communicating the change data to the component record keeping system operates to communicate the change data to at least one legacy system of the telecommunications system.

17. The system of claim 10, wherein the means for communicating the change data to the component record keeping system operates to communicate the change data to at least one administrative system of the telecommunications system.

18. A physical computer-readable medium having a tangible component and comprising instructions for assisting a computer system to perform a method for processing data in association with an operation performed by technician at a customer service location in a telecommunications system, the method comprising:
    transmitting data from the customer service location to a technician server at a location remote from the customer service location, related to at least one piece of existing telecommunications equipment being used in connection with a special service at the customer service location;
    communicating data from the technician server to a component record keeping system including at least one computer system maintaining equipment data for the telecommunications system;
    communicating from the technician server to the customer service location at least one alternative candidate, obtained from the communication with the component record keeping system, for the existing telecommunications equipment through at least one graphical user interface to the technician at the customer service location;

generating change data including at least one new candidate selected from a group of the alternative candidates for replacement of the existing telecommunications equipment at the customer service location; and communicating the change data to the component record keeping system for updating the telecommunications equipment data maintained thereon.

19. The computer-readable medium of claim 18, wherein the special service includes a high-speed data transmission service.

20. The computer-readable medium of claim 18, wherein the telecommunications equipment includes at least one cable pair.

21. The computer-readable medium of claim 18, further comprising accessing the graphical user interface for generating a list of the alternative candidates.

22. The computer-readable medium of claim 18, further comprising communicating with a technician server through an access device of the technician at the customer service location.

23. The computer-readable medium of claim 18, further comprising testing at least one of the alternative candidates prior to generating the change data.

24. The computer-readable medium of claim 18, further comprising generating at least one maintenance change document in connection with generating the change data.

25. The computer-readable medium of claim 18, wherein communicating the change data to the component record keeping system comprises communicating the change data to at least one legacy system of the telecommunications system.

26. The computer-readable medium of claim 18, wherein communicating the change data to the component record keeping system comprises communicating the change data to at least one administrative system of the telecommunications system.

* * * * *